(12) United States Patent
Spaetzel et al.

(10) Patent No.: US 12,086,387 B2
(45) Date of Patent: *Sep. 10, 2024

(54) PROCESSING ELECTRONIC SIGNATURE DATA IN A COLLABORATIVE ENVIRONMENT

(71) Applicant: Dropbox, Inc., San Francisco, CA (US)

(72) Inventors: John Spaetzel, San Francisco, CA (US); Maria Fernanda Mora Carrasco, Sunnyvale, CA (US); Kirtika Dommeti, Fremont, CA (US); Skyler Parr, Columbus, OH (US); Benny Kao, Pleasanton, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,515

(22) Filed: Apr. 28, 2023

(65) Prior Publication Data

US 2023/0333715 A1    Oct. 19, 2023

Related U.S. Application Data

(63) Continuation of application No. 17/136,465, filed on Dec. 29, 2020, now Pat. No. 11,644,952.

(51) Int. Cl.
*G06F 40/174* (2020.01)
*G06F 3/0482* (2013.01)
(Continued)

(52) U.S. Cl.
CPC .......... *G06F 3/0482* (2013.01); *G06F 40/174* (2020.01); *G06Q 50/26* (2013.01); *H04L 67/306* (2013.01)

(58) Field of Classification Search
CPC ...... G06F 3/0482; G06F 40/174; G06F 16/38; G06F 21/64; G06F 40/143; G06Q 50/26; H04L 67/306
See application file for complete search history.

(56) References Cited

U.S. PATENT DOCUMENTS 9,614,681 B2    4/2017   Follis et al.
10,430,515 B1   10/2019  Ohme et al.
(Continued)

FOREIGN PATENT DOCUMENTS

WO    2011139563 A2    11/2011

OTHER PUBLICATIONS

Advisory Action for U.S. Appl. No. 17/136,465 mailed on Dec. 2, 2022, 3 pages.
(Continued)

*Primary Examiner* — Hien L Duong
(74) *Attorney, Agent, or Firm* — Keller Preece PLLC

(57) ABSTRACT

A collaborative content management system (CMS) is disclosed herein for processing electronic signature data in a collaborative environment and performing actions based on the received data. The CMS may receive a selection of a content item to be electronically signed by one or more users. Upon receipt of the selection, the CMS may generate a fillable form and send the fillable form to be electronically filled out signed. When each user fills out and signs the form, the CMS may receive that form data and aggregate the form data with previously received form data. The CMS may determine whether the aggregated form data meets one or more conditions stored within the CMS and perform appropriate actions based on one or more conditions that are met.

20 Claims, 10 Drawing Sheets

(51) Int. Cl.
   *G06Q 50/26*   (2012.01)
   *H04L 67/306*  (2022.01)

(56) References Cited

U.S. PATENT DOCUMENTS

| | | |
|---|---|---|
| 2002/0133569 A1 | 9/2002 | Huang et al. |
| 2005/0102520 A1 | 5/2005 | Baxter et al. |
| 2005/0177389 A1 | 8/2005 | Rakowicz et al. |
| 2005/0246252 A1 | 11/2005 | Wallace et al. |
| 2006/0277123 A1 | 12/2006 | Kennedy et al. |
| 2007/0058597 A1 | 3/2007 | Frid-Nielsen et al. |
| 2008/0209313 A1* | 8/2008 | Gonser ............... G06F 40/186 715/255 |
| 2008/0270890 A1 | 10/2008 | Stern |
| 2009/0025087 A1* | 1/2009 | Peirson, Jr. ............ G06Q 10/00 713/193 |
| 2009/0292786 A1 | 11/2009 | McCabe et al. |
| 2011/0093769 A1 | 4/2011 | Dunn et al. |
| 2011/0093777 A1 | 4/2011 | Dunn et al. |
| 2011/0276875 A1 | 11/2011 | McCabe et al. |
| 2011/0314371 A1 | 12/2011 | Peterson et al. |
| 2012/0303962 A1* | 11/2012 | Ghani ................ G06Q 20/3821 713/176 |
| 2013/0019156 A1 | 1/2013 | Gonser et al. |
| 2013/0091171 A1 | 4/2013 | Lee |
| 2014/0019761 A1 | 1/2014 | Shapiro |
| 2014/0041052 A1 | 2/2014 | Follis et al. |
| 2014/0259159 A1 | 9/2014 | Banga et al. |
| 2014/0289595 A1* | 9/2014 | Park ..................... G06F 40/169 715/202 |
| 2015/0106877 A1 | 4/2015 | Meyers et al. |
| 2015/0178252 A1 | 6/2015 | Dunn et al. |
| 2016/0224526 A1 | 8/2016 | Gazit et al. |
| 2018/0060291 A1 | 3/2018 | Giffard-Burley |
| 2018/0124129 A1 | 5/2018 | Geisler et al. |
| 2018/0270070 A1 | 9/2018 | Altman et al. |
| 2020/0193088 A1 | 6/2020 | Shimkus |

OTHER PUBLICATIONS

Final Office Action from U.S. Appl. No. 17/136,465, mailed Jun. 16, 2021, 14 pages.
Final Office Action from U.S. Appl. No. 17/136,465, mailed Sep. 27, 2022, 12 pages,.
Non-Final Office Action from U.S. Appl. No. 17/136,465, mailed Feb. 11, 2022, 13 pages.
Non-Final Office Action from U.S. Appl. No. 17/136,465, mailed Mar. 1, 2021, 13 pages.
Notice of Allowance from U.S. Appl. No. 17/136,465, mailed Jan. 19, 2023, 6 pages.

* cited by examiner

700

Field Trip Permission Form

702 Throughout the year, students may have opportunities to participate in class trips, which may involve travelling by bus outside of the school building. Please fill out and sign this permission slip to allow your child to participate in these trips.

704 Student Name  710

706 Parent/Guardian  712

708 Signature  714

720 ~

Field Trip Permission Form

Throughout the year, students may have opportunities to participate in class trips, which may involve travelling by bus outside of the school building. Please fill out and sign this permission slip to allow your child to participate in these trips.

Student Name: _____

Parent/Guardian: _____

Parent/Guardian Signature: _____ Date: _____

730 ~

Field Trip Permission Form

Throughout the year, students may have opportunities to participate in class trips, which may involve travelling by bus outside of the school building. Please fill out and sign this permission slip to allow your child to participate in these trips.

Student Name: _____Joe Smith_____

Parent/Guardian: _____Jane Smith_____

Parent/Guardian Signature: ___*Jane Smith*___ Date: __1/1/2020__

PROCESSING ELECTRONIC SIGNATURE DATA IN A COLLABORATIVE ENVIRONMENT

CROSS-REFERENCE TO RELATED APPLICATIONS

The present application is a continuation of U.S. application Ser. No. 17/136,465, filed on Dec. 29, 2020. The aforementioned application is hereby incorporated by reference in its entirety.

TECHNICAL FIELD

The disclosed embodiments generally relate to processing electronic signature data in a collaborative environment.

BACKGROUND

Some systems enable a user to select and/or upload a document so that document may be electronically signed by another user or users. The document may include fillable fields that can be filled in such that the filled in data may be sent back together with the electronic signature. When the data is received, the filled in data and the signature data may be stored. For example, a school may send a permission form to be electronically filled out and electronically signed by parents so that students are able to go on a school trip. The form may include various fields (e.g., student name, parent name, etc.) in addition to the signature field. When the signatures are received the students may be allowed to go on the school trip.

SUMMARY

Although currently available systems enable a sending user to receive the signed documents, those systems fail to automatically analyze the signature/form data being received in combination with signature/form data received earlier and perform actions associated with the aggregated/received data. Systems and methods are disclosed herein for digitally processing and analyzing electronic signature data in a collaborative environment and performing actions based on the processed and analyzed data. Analyzing and processing this data enables the system to provide a user with statistics (e.g., how many people filled out submitted a particular digital form) and other information about the signature process. In addition, analysis and processing may enable a system to execute one or more actions associated with the state of the received form data, resulting in not only an improved user interface for viewing the progress of a particular signature request, but also enabling automatically tracking that progress and taking actions based on the progress and the data associated with a particular signature request. Moreover, this process may save storage space and optimize the limited display area (e.g., on mobile devices) by consolidating the data and statistics about each signature request in a single location (e.g., in one file). A content management system (CMS) may receive a signature request from a client device associated with a user account. The signature request may indicate one or more target user accounts for receiving the signature request. The request may also indicate a content item (e.g., an electronic document) selected by the user. For example, the user may upload or otherwise select within the CMS a document that may be sent for signature. When the CMS receives the document or the selection of the document in the signature request, the CMS may generate a fillable form that includes a set of fields. The fields may include a signature field.

When the fillable form is generated, the CMS may send a notification that the form is available to one or more target user accounts. The notification may request that the fillable form be filled out and signed. Furthermore, the notification may include the fillable form or a link to the fillable form. As users fill out and sign their corresponding forms, the CMS may receive from those user accounts, form data resulting from the users filling out their corresponding form.

In response to receiving the form data, the CMS may retrieve one or more conditions associated with signature request. A variety of conditions may be generated and/or preset (e.g., preconfigured by the user) for the signature request. For example, one condition may be whether a predetermined percentage of signatures has been received. In another example, the condition may be whether all users have filled out and signed the form. In yet another example, the condition may be whether a specific user has filled out and signed the form. The CMS then determines whether one of the conditions has been met by receipt of the form data. For example, the CMS may determine whether a certain percentage or ratio of users filled out and/or signed the form. For example, some forms may only require filling the form out without needing a signature.

Based on determining that a condition has been met by the receipt of the form data, the CMS may perform an action associated with the condition. For example, in one embodiment, when a signature from a particular user is received, a calculation is performed on the data associated with the signature in combination with other received signature data. The calculation may indicate that a certain percentage of users filled out and signed the form. Based on that calculation, the CMS may trigger a reminder for the target users to fill out and sign the form. In another example, when the CMS starts receiving the data, the CMS may generate an electronic record (e.g., a file) that includes that data. In another example, when the CMS detects that a particular user of a particular user account filled out and signed the form, the CMS may grant that user account access permissions for certain electronic resources.

In some embodiments, the CMS may generate a content item or update a content item (e.g., a document, a webpage, an image, etc.) when new signature data is received from any user (or from a particular user). For example, the CMS may include a webpage or a spreadsheet document that tracks user signatures for a particular signature request. The CMS may update the webpage or the spreadsheet when new signature data is received.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 7B illustrates an exemplary content item, and the same content item with filled-in form data, according to example embodiments.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
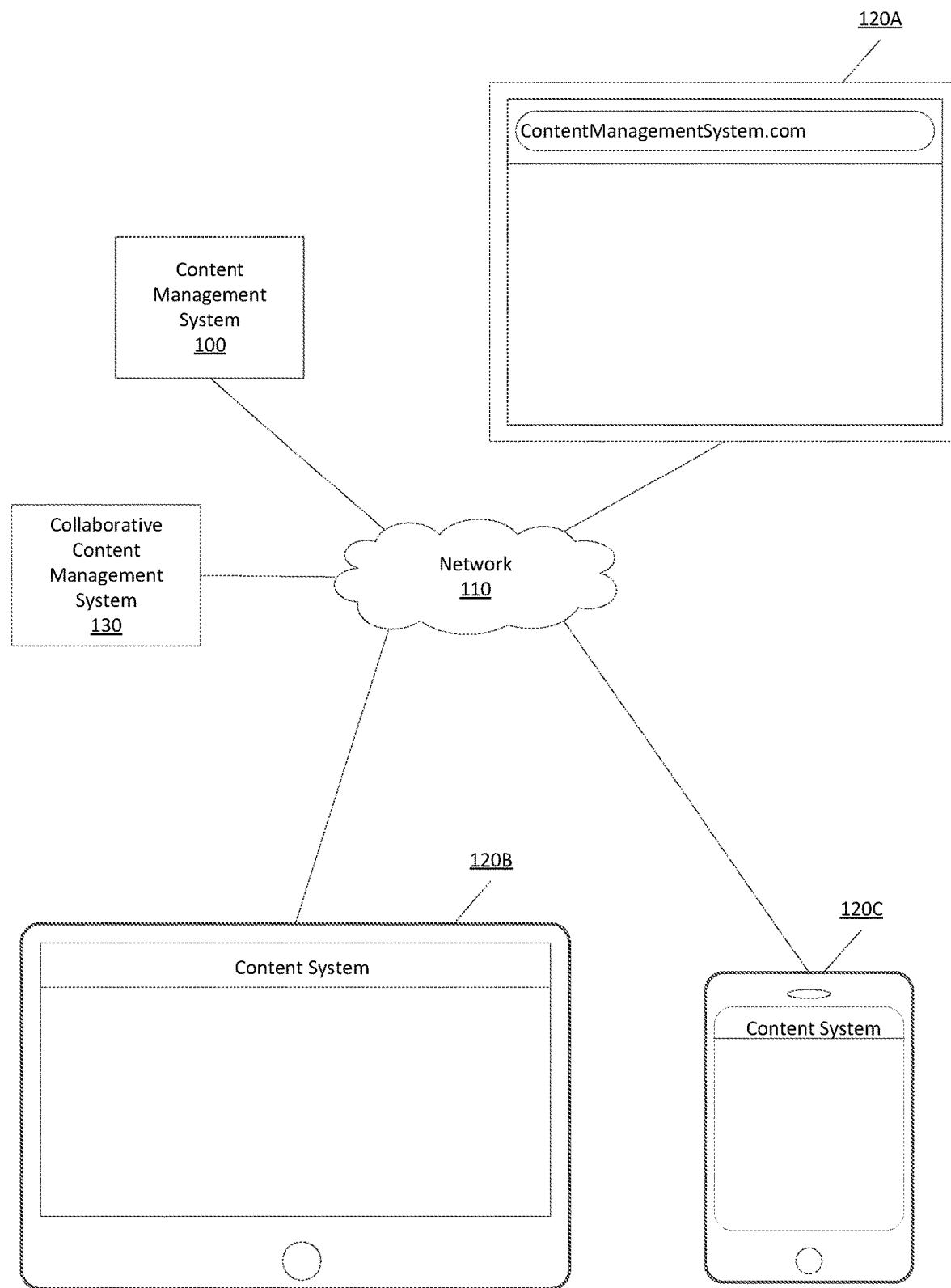
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. In some embodiments, client device 120 may instruct CMS 100 to retrieve the content from a specified source. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for target users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
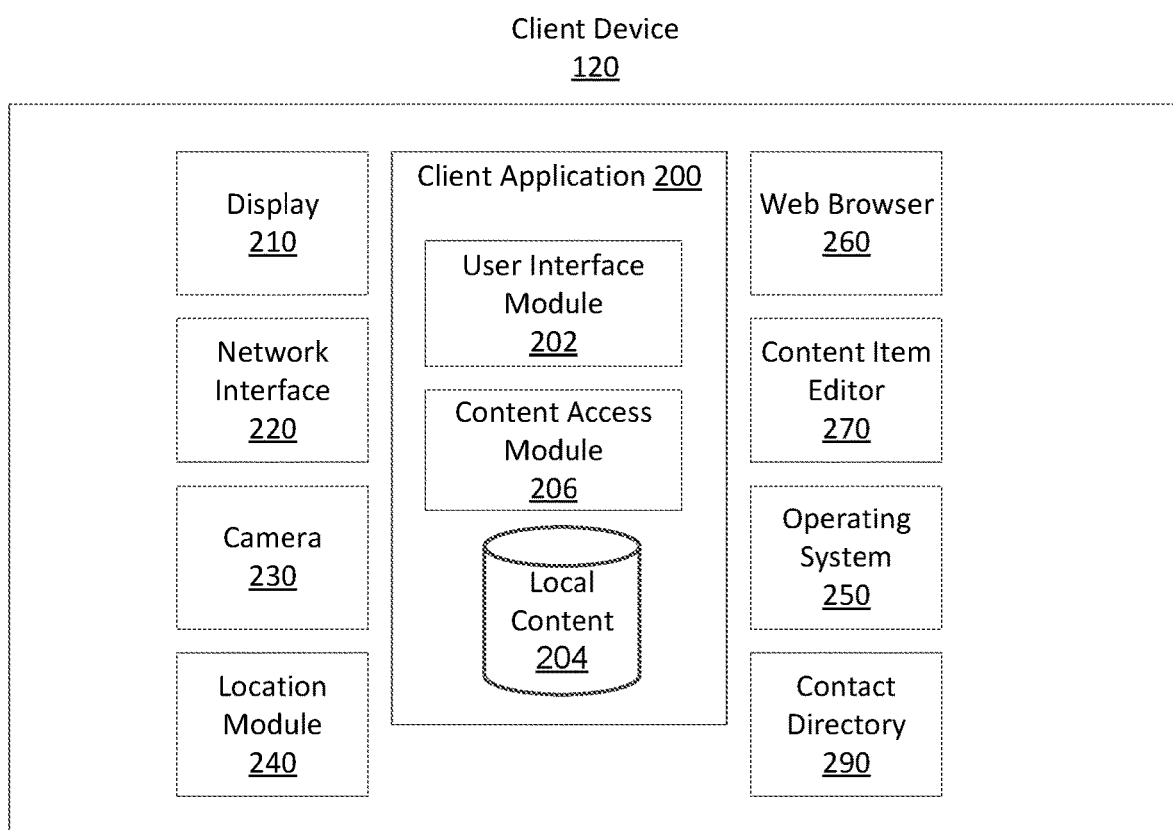
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
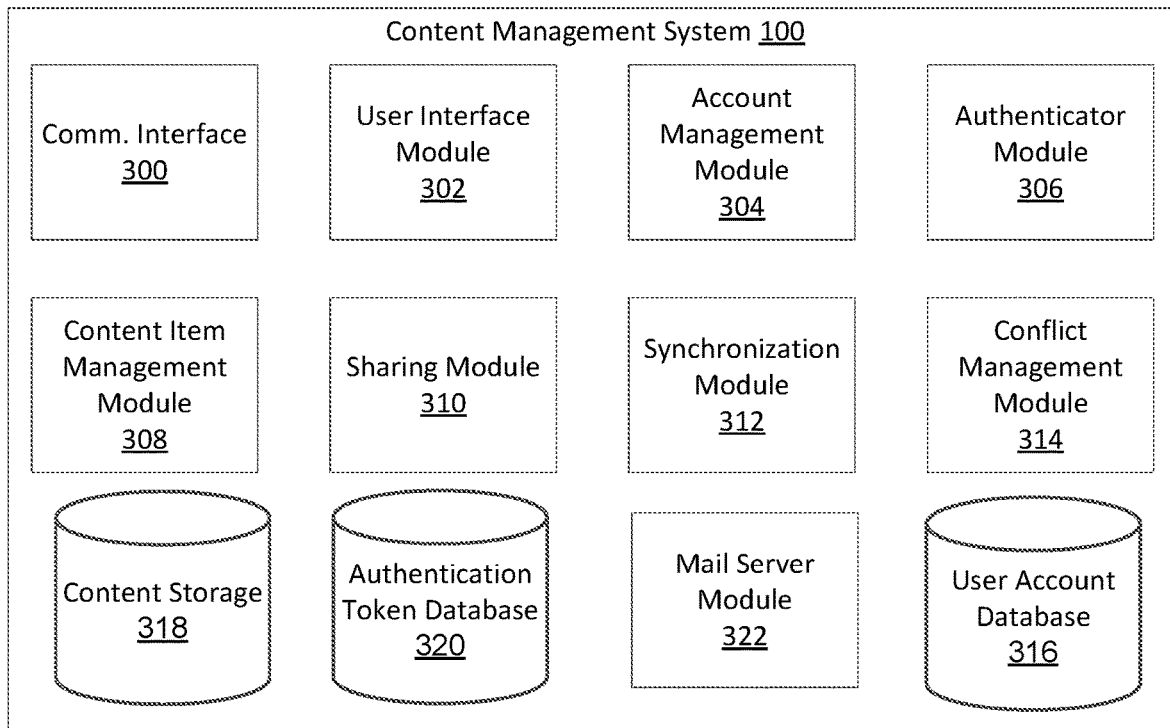
FIG. 3 shows a block diagram of a content management system, according to example embodiments.

FIG. 3 shows a block diagram of content management system 100 according to example embodiments. To facilitate the various content management services, a user can create an account with content management system 100. The account information can be maintained in user account database 316. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
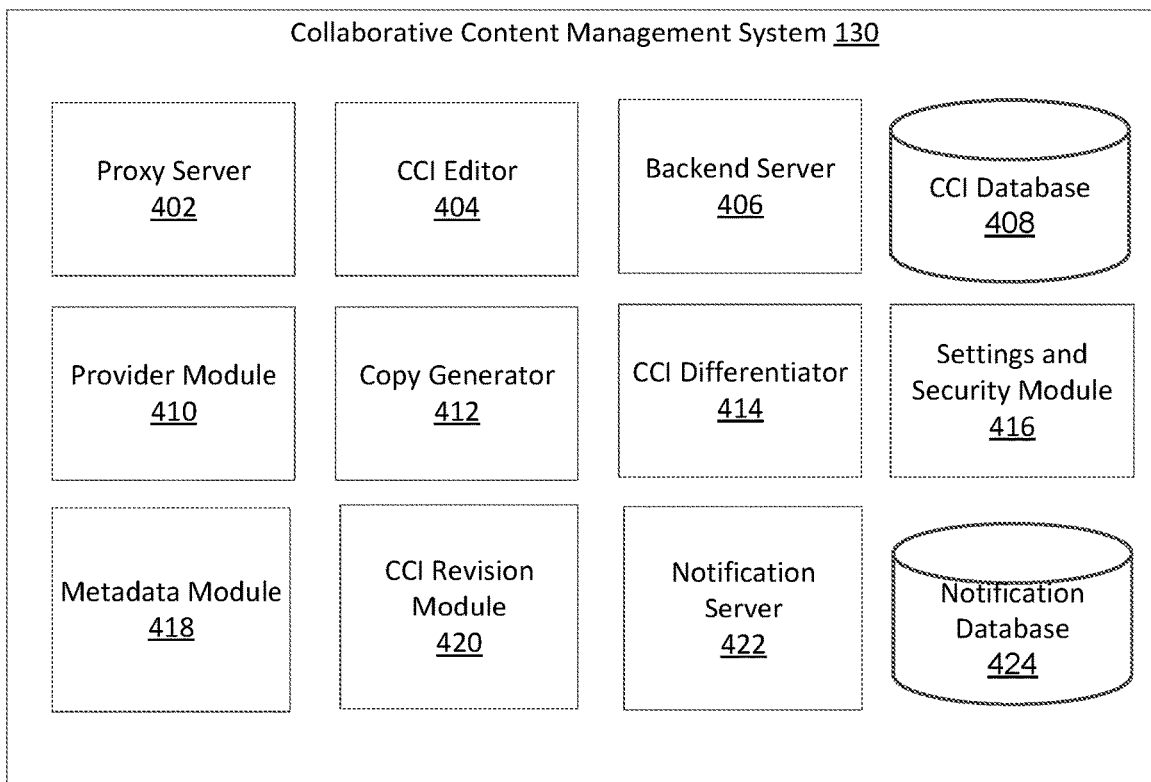
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with target users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including memory (e.g., random access memory (RAM), read-only memory (ROM) and/or storage devices such as hard disks, solid state drives (SSDs), and other types of memory), network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

The CMS or another suitable system may enable a user to select a document, add some fields to the document and send the document out to target users and/or use accounts so that the fields are filled in by the target user and/or user accounts and the data from those fields is sent back. In some embodiments, the CMS or the other suitable system may enable the document to be signed by the users that receive the document. The CMS or the other system may receive a file (e.g., a portable document format (PDF) file) and enable a user to add fields to the file. In some embodiments, the file may already exist and be stored within the CMS and the user may select the file to turn into a fillable form. Some files may require a large number of fields while other may require a small number.

Processing Signature Data

As discussed above, CMS 100 includes a communications interface 300 that is configured to receive data from client devices (e.g., client device 120). The CMS may receive, via communications interface 300, from a client device associated with a user account, a signature request indicating one or more target user accounts. The user accounts may be accounts associated with the CMS or another system. For example, at least some of the user accounts may be email addresses associated with various email systems. The request may also include an indicator of a content item from the requesting user account. For example, the content item may be a file in a Microsoft Word format, a portable document format (PDF), an image format, a Microsoft Excel format, an XML format, a PowerPoint document or another suitable presentation format document, a Hypertext Markup Language document, or any other format that may be displayed by a computing device.

Figure 5:
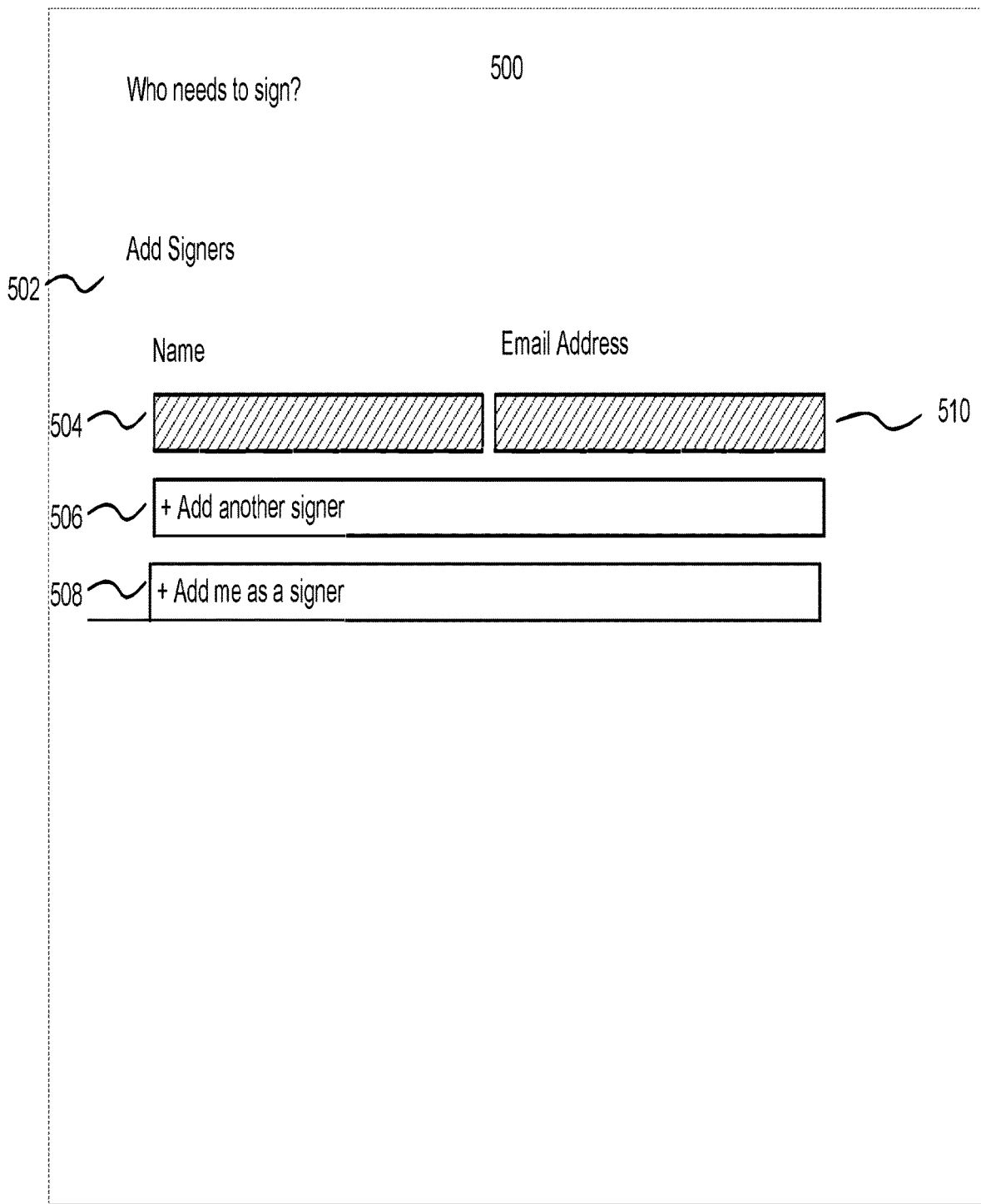
FIG. 5 illustrates a graphical user interface for selecting user accounts for electronic signature, according to example embodiments.

FIG. 5 illustrates a graphical user interface ("GUI") for selecting user accounts for electronic signature, in accordance with some embodiments. FIG. 5 includes one or more prompts 502 that explain to the user what the GUI is designed to accomplish. FIG. 5 also includes a fillable field 504 for inputting a name associated with a target user account and email address field 510 for inputting an email address associated with the target user account (e.g., from field 504). Although field 510 is illustrated as an email address field, field 510 may include any type of an identifier that enables the CMS to contact the corresponding user. For example, in some embodiments, field 510 may accept as input a CMS account name or a CMS account ID associated with a target user.

Selectable GUI element 506 enables the user to add more target user accounts, which are sometimes referred to herein as "target users," "signers," or "recipients." When the user selects (e.g., using a mouse or a touch device) GUI elements 506, the CMS may receive that selection and add one or more other fields for adding other signers. For example, the CMS may cause another set of fields 504 and 510 to be added to the GUI. GUI element 508 enables the user to add himself or herself as a signer of the document. In response to receiving a selection of GUI element 508, the CMS may retrieve the user's account address (e.g., an email address or another suitable electronic address for contacting the user) and add that address to the list of signers.

GUI 500 of FIG. 5 may be an interface displayed on a client device. For example, a client application may generate display GUI 500 and accept the input for the user. Once the input is received, the client application may send the input data to the CMS residing on a server device. In some embodiments, GUI 500 may be generated by the CMS on the server device and served to the client device (e.g., as a web page) using a third-party application (e.g., a web browser). The user may input the data into the web page to be submitted to the CMS.

As another example, the CMS may already store one of more content items associated with the user account, and the user may select one of those content items (e.g., through a GUI of the CMS client application), in which case the CMS may receive from the client device data identifying the content item that is already stored on the CMS, without receiving the actual content item from the client device. In some examples, both the CMS and the client device can store the same content items associated with the user account in a synchronized manner, in which case the user may select one of the content items stored on the client device and cause the client device to send to the CMS an identifier of the selected content item without sending the actual content item.

Although various embodiments are described with references to the CMS, the actions described herein may be performed by a different system and/or by a combination of another system and the CMS. For example, a different system may interface with the CMS where a user account is able to access content items in the CMS. The user interface of the CMS may enable a user to select a content item and when the content item is selected another system may perform the actions described herein. In some embodiments, as discussed below, the CMS may be adapted to perform the actions described herein. For example, modules and other programming code may be added to the CMS to perform these actions. In yet some embodiments, another system may perform all the actions described herein. For example, that system may have access to the CMS where a list of available content items may be displayed to the user. When a user selection of the content item is received, the other system may request and receive the content item or content items from CMS and perform all the other processing. In some embodiments, the various embodiments that are described may be performed by the collaborative content management system.

Figure 6:
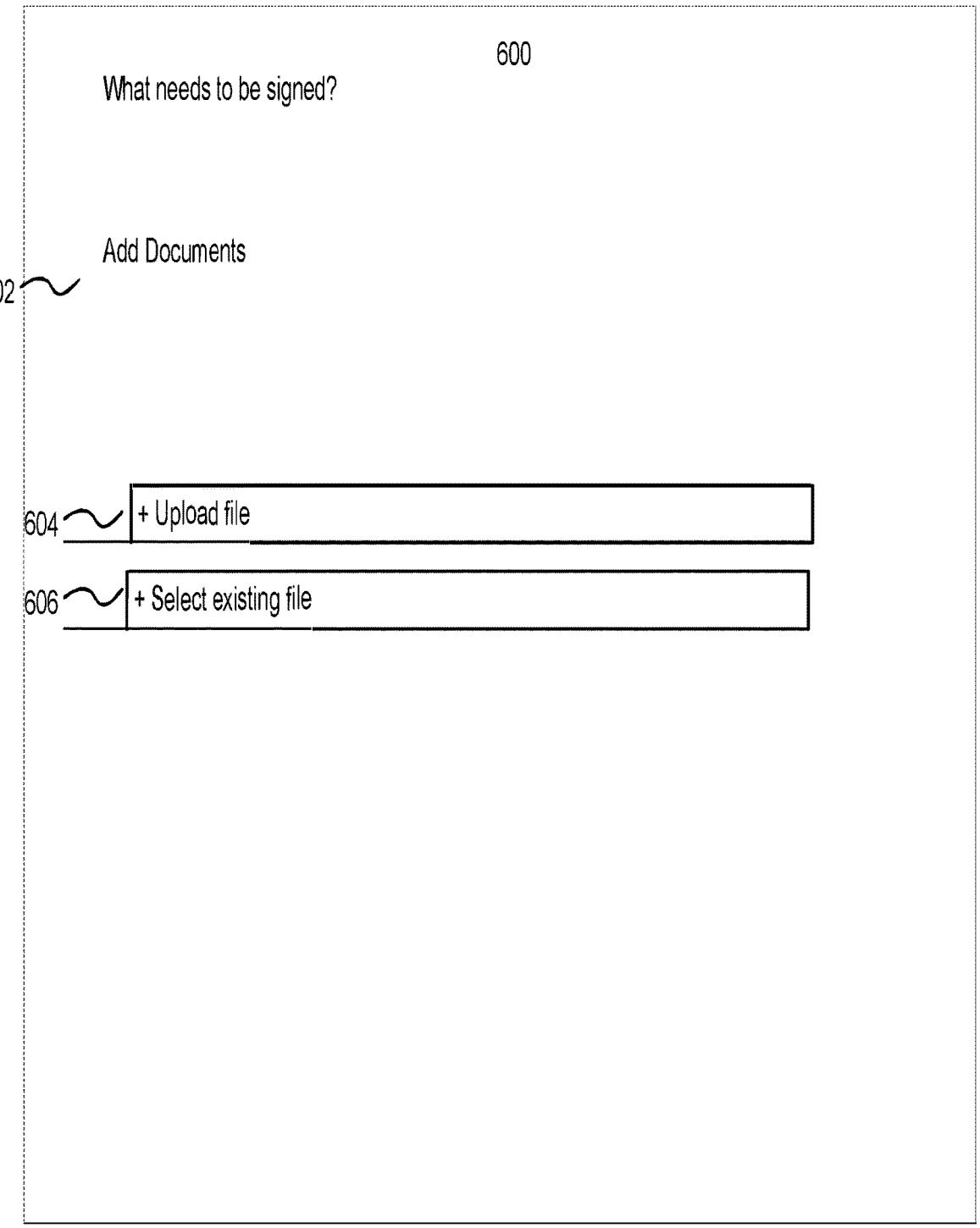
FIG. 6 illustrates one possible GUI for selecting a content item and instructing the CMS to turn the selected content item into a fillable form.

When the signature request is received, the CMS may, responsive to receiving the signature request, generate, using the content item, a fillable form that includes a set of fields. In some embodiments, the set of fields includes a signature field, while in other embodiments, the fields do not include a signature field. FIG. 6 illustrates one possible GUI for selecting a content item and instructing the CMS to turn the selected content item into a fillable form. FIG. 6 includes prompts 602 that explain to the user what the GUI is designed to accomplish. GUI element 604 enables a user to select one or more content items stored on the client device (or a third-party content management system other than CMS 100) to be uploaded to the CMS. When the user selects GUI elements 604, the user selection may be received by the CMS, by the client application, and/or a third-party application (e.g., a web browser). The receiving system may generate for display a list of content items that may be received by the CMS (e.g., uploaded to the CMS). When the user selects a content item, the content item may be uploaded to the CMS (e.g., by the client application, a third-party application, or by another application residing on the client device).

GUI element 606 may enable a user to select a content item that is stored in the CMS. For example, in response to a selection of GUI element 606, the CMS may cause a display of the list of content items that may be turned into fillable forms and sent for signature. GUI 600 of FIG. 6 may be an interface displayed on a client device. For example, a client application may generate display GUI 600 and accept the input for the user. Once the input is received, the client application may send the input data to the CMS residing on a server device. In some embodiments, GUI 600 may be generated by the CMS on the server device and served to the client device (e.g., as a web page) using a third-party application (e.g., a web browser). The user may input the data into the web page and to be submitted to the CMS. In some embodiments, an application on a client device (e.g., the client application, third-party application, or another suitable application) may interface with the CMS (e.g., via an application programming interface) and request a list of content items stored in the CMS. The list of content items may be received by the client device and displayed to the user for selection. In some embodiments, the client device can maintain synchronized copies of the user's content items stored on the CMS. In those embodiments, GUI element 606 may enable the user to select content items that are stored both on the client device and on the CMS.

As mentioned above, when the CMS receives the signature request, the CMS may generate a fillable form that includes a set of fields. For example, the fillable form may include one or more fields (e.g., as metadata) for the one or more signers to fill in. In some embodiments, the metadata may include a link or another pointer to where the data structure(s) corresponding to the fields are stored. The fields may be stored in association with a content item identifier so that they can be retrieved. In some embodiments, the fields may be stored in the metadata of the document. The fields may be stored, for example, as XML structures. In some embodiments, these fields may be stored in a separate file in the CMS. The CMS may store the fields together with an identifier or signature (e.g., a hash or another suitable identifier of the document).

In some embodiments, the CMS may store mapping between the fields and the fields of the data structure. For example, the CMS may store, in the data structure, the name of the corresponding overlaid field and an identifier of the associated content item (e.g., a document that was used with the request). Based on the information, the CMS may retrieve the content item and the metadata specifying where in the document each overlaid field is to be placed. The CMS may place the form data for a specific signer in the content item at a location of the associated overlaid field.

As referred to herein, the term overlaid field refers to an area on a content item (e.g., a document) that overlays a space on that content item that can be filled in by a user operation (e.g., user input). The space in the original content item may have been meant for a person to use a writing instrument to enter a response. Some examples of the overlaid field may include a text box for entering text, a check mark, an option selection field, or another suitable field. In some embodiments, the fields include a signature field. The signature field enables the user to input or otherwise to provide a signature. The signature field may include a time of signature and may also include a workflow for the user to sign the document.

Figure 7A:
FIG. 7A illustrates a GUI of a fillable form generated from a content item, according to example embodiments.
Figure 7A:
Figure 7A:

FIG. 7A illustrates a GUI of a fillable form 700 generated from a content item. FIG. 7A includes text 702 which does not have an associated overlaid fillable field. Elements 704, 706, and 708 include corresponding fields 710, 712, and 714, respectively. The CMS may store one or more data structures for the fillable form. FIG. 7B includes a content item 720 that can be processed by the CMS to transform that content item into fillable form 700.

When the fillable form is ready and the list of signers has been received, the CMS may send, to the one or more target user accounts, a notification requesting that each of the one or more target users fill out the fillable form. The notification may include the fillable form and/or a link to the fillable form. In some embodiments, the CMS may send an electronic mail ("e-mail") message to each recipient indicated by the user. In some embodiments, the CMS may notify the target users that have associated CMS accounts via the CMS itself (e.g., by placing a notification into the corresponding user's account).

When the transmission is sent, the CMS may be configured to receive form data from different types of devices. For example, a smartphone may need to access the form in one format (compatible with the smartphone), while a desktop computer may need to access the form in another format. Thus, the CMS may receive from a client application a request to access the fillable form. The request may include information indicating the type of client device the client application resides on. The CMS may determine a type of client device executing the client application. The CMS may extract the type from the received request to access the fillable form. In some embodiments, the CMS may store an identifier of each client device together with other information associated with the client devices (e.g., type, name, etc.). The CMS may compare the identifier of the client device associated with the received request with stored identifiers and identify the matching client device. The CMS may retrieve the type associated with the matching client device.

The CMS may translate the fields of the fillable form into a format compatible with the type of client device. For example, each type of client device may have an associated format or template that the CMS may use for displaying fillable forms on that type of client device. The CMS may retrieve the format or template associated with the type and adapt the field layout of the fillable form based on the format or template. For example, smartphone format may require a different resolution and/or field placement than various other devices. The CMS may send the translated fields of the fillable form to the client application.

When the form is sent out, the CMS may be configured to receive the form data. That is, the CMS may receive, from the one or more target user accounts, form data resulting from the one or more target users filling out the fillable form. In some embodiments, the CMS may receive form data and store the form data within the CMS in association with the user account that generated the fillable form. For example, the CMS may generate a workspace or a folder associated with the signature request. The workspace or folder may be in association with the user account and may generated at the time the signature request is generated or at the time when a first response (or a set of responses) to the signature request is received.

In some embodiments, the CMS may generate aggregated form data based on the form data and other previously received form data. For example, when the form is generated or when the first set of form data is received, the CMS may generate a data structure that includes a field for each overlaid field in the form. Each field within the data structure may store data associated with the specific overlaid field. The data structure may be generated in memory and/or stored in a file (e.g., XML-formatted file, comma-separated format file, or another suitably formatted file). The data structure may store a plurality of fields corresponding to form data for every signer. The CMS may access the form data and aggregate the form data to generate statistical information based on the form data. For example, the CMS may determine a number of signers that submitted the form data, break down the dates/time when the signers completed the requests, etc. In some embodiments, the CMS may determine how many signers filled out a specific field with the same information. For example, if the field is asking for a gender, the CMS may determine how many people filled out that filled with the same response.

In some embodiments, the CMS may determine how many fields were left blank (e.g., no response to the prompt of the field was recorded). For example, the CMS may identify a particular overlaid field that was left blank by a multitude of signers. That may indicate that the prompt for that field is unclear or otherwise problematic. In response, the CMS may notify the requestor (e.g., via an email) regarding the field being left unfilled.

In response to receiving the form data, the CMS may retrieve one or more conditions associated with signature request or with the aggregated form data. For example, the conditions may include receiving the form data from a pre-determined percentage of the one or more target users, receiving the form data from a particular user of the one or more target users, and/or other suitable conditions. In some embodiments, the condition may be that new form data is received. The CMS may retrieve the one or more conditions and compare the updated form data and/or the statistical information with the one or more conditions. For example, the statistical information may indicate that form data was received from a particular percentage or number of users. The CMS may compare the statistical information with the corresponding condition and determine whether the condition has been met (e.g., whether the particular percentage is at or above the predetermined percentage of the condition). In another example, the CMS may determine the user account associated with the received form data matches a condition. For example, a condition may be met if the form data was received from a particular use for the first time (e.g., the user filled out and signed the form for the first time).

In some embodiments, the CMS may identify other conditions associated with the aggregated form data. For example, a condition may be a number of users that filled out a particular field with the same value. That is, the condition may be that a certain number of people of each gender filled out and signed the form. In another example, a condition may be that a particular number of signers filled out and signed the form within a specific amount of time (e.g., with 24-hours, 7 days, or another suitable amount of time).

Based on determining that a condition has been met by the receipt of the form data, the CMS may perform an action associated with the condition. In some embodiments, the CMS may take the action of populating the content item with the received form data. For example, the CMS may generate a data structure and store the received form data within the data structure. The data structure may be linked to the content item. In response to a request from the user that generated the signature request, the CMS may generate for display the content item together with the received form data for a particular target user. FIG. 7B illustrates filled out form 730 with the signature field 732 showing data corresponding to signature attributes. In some embodiments, the CMS may show the signature as encrypted data. The CMS may generate for display filled out form 730 based on any received form data from any target user account.

In some embodiments, based on determining that a condition has been met by the aggregated form data, the CMS may perform an action associated with the condition. For example, the CMS may determine that a non-disclosure agreement has been received from all participants in a negotiation. As a result, the CMS may enable access to a content item (e.g., a content item containing some private, confidential, or privileged information) and/or to a folder or workspace associated with (e.g., containing) the content item.

In some embodiments, the CMS may send a message to the user that generated the signature request indicated that new form data has been received. The message may be an e-mail, a direct message (DM), or another suitable type of message. In some embodiments, the message may be generated in response to every instance of form data being received. However, in some embodiments, the CMS may generate and send a message at predetermined intervals (e.g., every 6 hours, 12 hours, or another predetermined interval). In some embodiments, the CMS may send a message when a predetermined percentage (e.g., 80% or 100%) or ratio of target users have filled out and signed the form (e.g., when the CMS receives form data from a predetermined percentage or ratio of users).

In some embodiments, the CMS may generate a new content item that includes the received form data and store the new content item in association with (e.g., in the same folder or workspace as) the content item associated with the request. For example, the CMS may generate a PDF document of the received form data added to the fields on the document. In some embodiments, the CMS may generate an electronic file (e.g., a spreadsheet) that stores received form data (e.g., in a format that the data was received or in another suitable format). In addition, the CMS may generate/update the electronic file (or another electronic file) with statistical/analytical information derived from the received form data. The electronic file may include statistics (e.g., totals, averages, etc.) and/or graphing data associated with those statistics.

In some embodiments, every time the CMS receives form data in response to the signature request, the CMS may update the earlier received form data (e.g., earlier received aggregated data) with the newly received form data and/or update statistical information associated with the form data. Statistical information may include the number of users from which form data was received, a percentage or a ratio of users from which the form data was received (e.g., response rate), a number of fields that were left blank, and other suitable statistical or analytical data.

Figure 8:
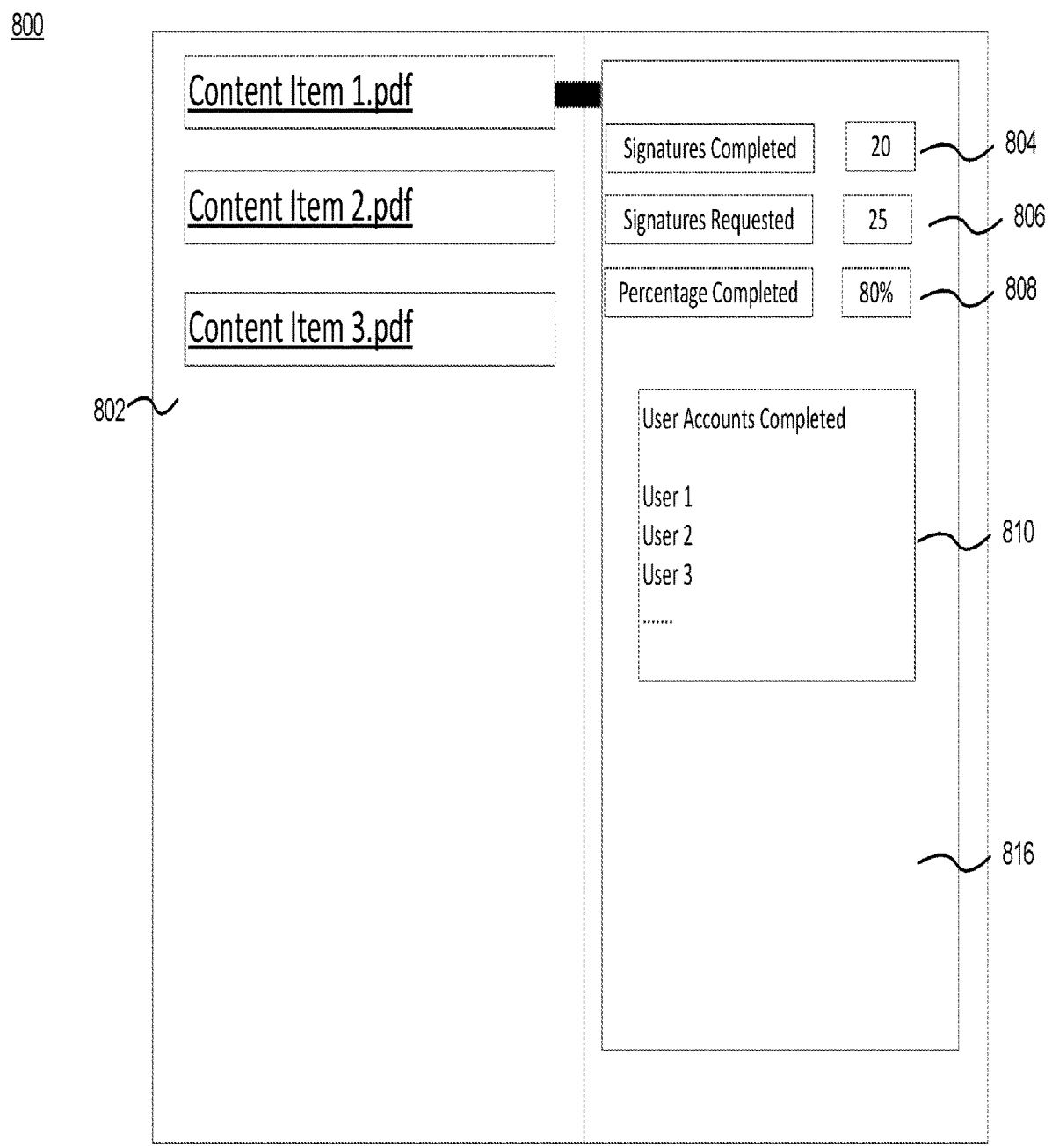
FIG. 8 illustrates a GUI that may display some aggregated form data, according to example embodiments.

FIG. 8 illustrates a GUI that may display some aggregated form data. GUI 800 includes area 802 that displays indicators of content items that are available to the user in associated with the use account. Each indicator in area 802 may be selected by the user. When the CMS receives a user selection of the indicator, the CMS may access the metadata associated with the content item (e.g., the received form data and the statistical information associated with the form data). The CMS may display the metadata in area 816. The displayed information may include an indication 804 for a number of completed signature requests, and indication 806 for a number of signatures requested, and an indication 808 for a percentage of completed signature requests. In some embodiments, area 816 may include list 810 for a list of user accounts that completed the signature requests. Area 816 may include other indicators.

In some embodiments, area 816 may be customizable. For example, the CMS may enable a user to configure what information is included in area 816. For example, the CMS may include an API that enables access to form data and the statistical information. The CMS may generate a GUI that enables a user to select form and statistical data to be included in area 816. When the user makes his or her selections in the GUI, one or more API calls may be generated. The generated API calls may be executed by the CMS every time a user selects the corresponding content item.

In some embodiments, the functionality of FIG. 8 may be integrated into the CMS. For example, the CMS may generate for display one or more indicators for one or more content items available in the CMS. This may be performed via general CMS functionality described earlier in this disclosure. The CMS may receive a user selection of a displayed content item. For example, a user may use a mouse or a touch screen to select the content item. When the content item is selected, the CMS may access the metadata of the content item and check whether form data flag has been set in the metadata. For example, the metadata for the content item may be stored as an XML file and that file may include a tag that indicates whether the associated content item has corresponding form data. In some embodiments, the metadata may include a link or another suitable way to access the form data. The CMS may generate for display at least a portion of the form data associated with the signature request. In some embodiments, the CMS may generate for display at least a portion of the statistical information associated with the signature request.

In some embodiments, the CMS may enable a user to view previously sent signature requests and perform actions based on those requests. The CMS may generate for display (e.g., on a client device via a client application or a third-party application) one or more indicators for one or more signature requests. The indicators may be selectable. When a user selects an indicator, the CMS may receive a user election of a displayed signature request and generate for display one or more options associated with the selected signature request. The options may include one or more options to take an action and/or one or more options to display data.

Figure 9:
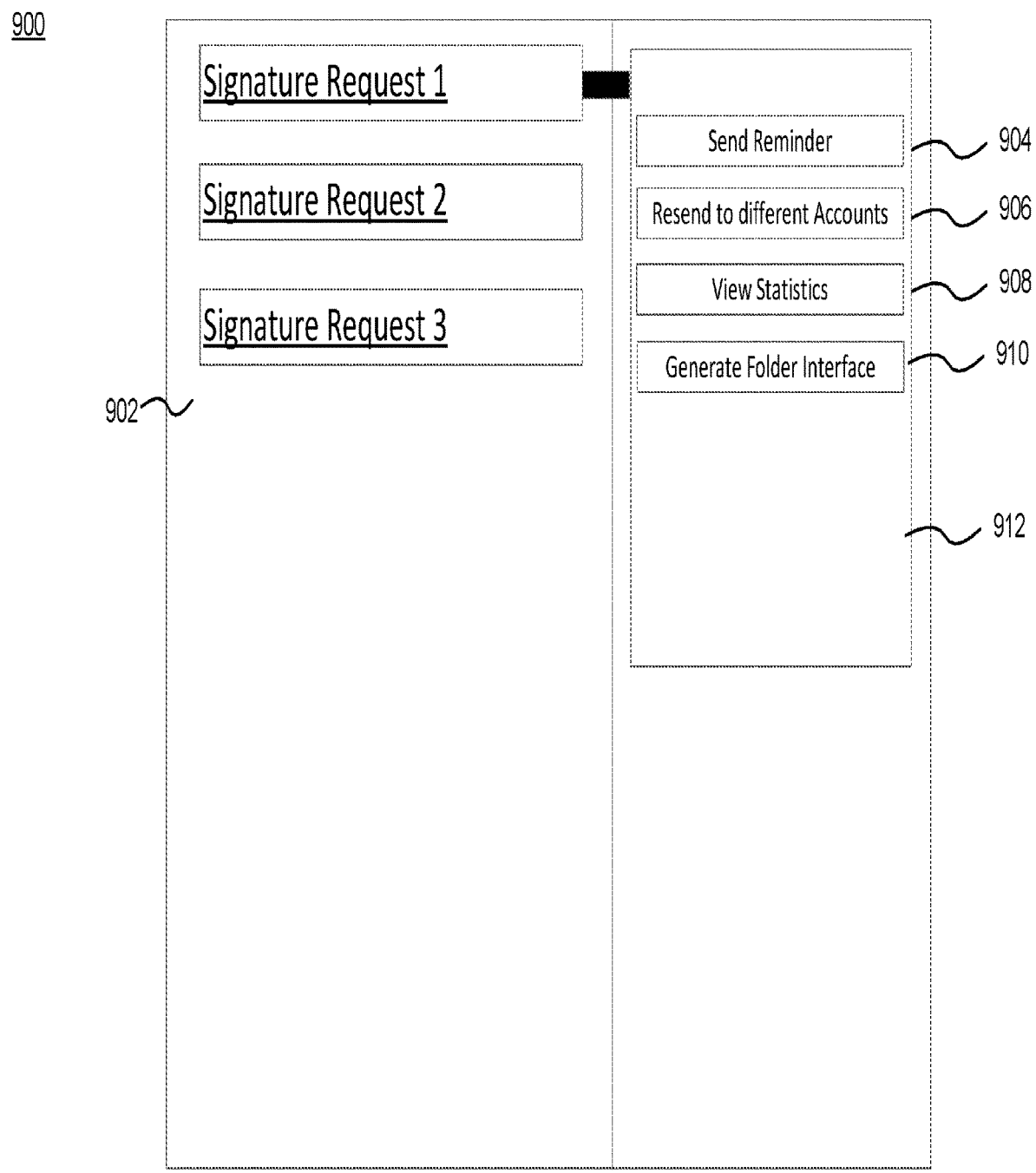
FIG. 9 is an illustrative GUI for reviewing past signature requests, according to example embodiments.

FIG. 9 is an illustrative GUI for reviewing past signature requests. Area 902 illustrates a display of multiple indicators for multiple signature requests. The indicators may identify the signature requests (e.g., by request name, content item name, and/or by another suitable identifier). The CMS generates for display area 912 when a user selection of one of the identifiers in area 902 is received by the CMS. Display area 912 may include a list of options available to the user. Option 904 enables a user to send a reminder to target users who have not yet filled out and signed the form. When option 904 is selected, the CMS may determine, from received form data and request data which target users have not yet filled out and/or signed the fillable form. When the determination is made, the CMS may send a message to each of those users (e.g., using an address specified by the user when the signature request was created).

Option 906 enables a user to resend the fillable form to different accounts. For example, upon the selection of option 906, the user may be prompted to generate a new signature request for the same fillable form. The user may be enabled to choose different user accounts for transmission of the fillable form. Option 908 enables a user to view statistics (e.g., statistical information) associated with the signature request. For example, the CMS may display statistical information described above in response to the selection of option 908. Option 910 may enable the user to generation a folder interface for the selected signature request. For example, when option 910 is selected, the CMS may generate the folder interface associated with FIG. 8.

The CMS may take the following actions when processing user input associated with the GUI of FIG. 9. The CMS may receive a user selection of an option and identify which option was selected based on the use selection. For example, a client device may process a touch command on a touch interface and the client application may determine which option was selected. That selection may be sent to the CMS. Based on the data in the selection (e.g., a code identifying the selected option), the CMS may retrieve a command associated with the selected option. For example, the command may be "send reminder" corresponding to option 904. The CMS may then identify request data associated with the selected option. For example, the CMS may identify user account addresses for target users for sending the reminder (e.g., users that have not completed the fillable form). The CMS may also determine what to send to those users (e.g., the reminder may be associated with a specific e-mail template). The CMS may then execute the command using the request data. For example, the CMS may send the reminder to the set of target users.

In some embodiments, a condition is met by receipt of the form data and an indication that the fillable form was completed by a target user. That is, the CMS may determine that a particular target user has filled out, signed, an submitted the fillable form. In response, the CMS may modify the target user's permissions to access one or more content items within the CMS associated with the signature request. For example, the signature request may be for a form that upon signature gives the signing user the right to view certain information. The form may be a non-disclosure agreement that needs to be electronically signed before a user is able to view a certain content item in the CMS or have access to a certain folder or workspace within the CMS. Therefore, upon the receipt of the form data from the corresponding user account, the CMS may modify the permissions for an object to enable the user to access the object. In some embodiments, the CMS may notify the target user of modified permissions of the content item. For example, the CMS may generate a message (e.g., an email message) to the address associated with the user account.

In some embodiments, the CMS, in response to receiving form data from a particular user may grant that user access to the CMS. For example, the fillable form may be a form required to receive access to the CMS. The form may be a "terms of use" that need to be signed by the user, or another suitable form. When the CMS receives the form data from a user account, the CMS may retrieve an identifier associated with the target user. For example, the identifier may be an address (e.g., an email address of the user). However, any suitable identifier may be used by the CMS. The CMS may generate a new user account based on the identifier. The identifier may be used as the identifier of the user account. In some embodiments, the CMS may notify the target user (e.g., via an email message or another suitable message) that a new user account has been created. The notification may include a way for the target user to login into the new user account.

In some embodiments, the CMS may include conditions and actions that are not based on aggregated form data but are based on the particular form data being received. For example, when a form data is received, the CMS may generate a comment in a workspace (e.g., a folder) associated with the request. The comment may include at least some of the information from the form data (e.g., the name of the signer or other suitable data). The comment may be displayed when the user that generated the request selects the folder or content item associated with the request. The workspace may include one or more content items and the comment may be generated, by the CMS, from the content item itself. In addition, the comment may be added by the CMS and/or based on a user command.

In some embodiments, the CMS may generate or update a webpage based on the received form data. For example, when form data is received, the CMS may identify the request associated with the form data. The CMS may store the received form data with other form data received in association with the particular request. When, for example, the CMS receives a selection of the request or the content item, the CMS may access the stored data an determine that the received form data has been added to the previously received form data and generate a webpage to include the new received form data. In some embodiments, the CMS may determine that some fields should not be displayed in the webpage (or in a spreadsheet described above). For example, the signature data may be a hexadecimal or other data that would not help the viewer of the webpage. Instead, the CMS may generate for display a data and/or time when the signer signed the particular form. In another example, the CMS may omit some fields may include sensitive information (e.g., personally identifiable information).

In some embodiments, the CMS may store different versions of a file that stores the received form data. For example, each time the form data is received, the CMS may update the file and store a new version of the file. Based on the different versions, the CMS may determine when various form data was received.

In some embodiments, the CMS may follow specific workflows when form data is received. For example, the CMS may determine that form data has been received from a particular person that is associated with a CMS account. The CMS may, in response to receiving the form data, enable the associated CMS account to view/edit/access a particular folder (e.g., change folder permissions). In some embodiments, the CMS may create a folder or workspace in association with the CMS account of the signer and/or place content items in that folder or workspace. For example, the request may be associated with providing to a particular CMS account access to a content item or a folder. However, to get access the user associated with that user account has to sign a non-disclosure agreement related to the content or folder. When the CMS receives the form data (e.g., the signed non-disclosure agreement) the CMS may enable the user account of the signer to access to the content item or the folder.

In some embodiments, the request may be associated with a particular task. The task may be stored within the CMS. As the form data is received, the CMS may update the task (e.g., completion percentage). Indicators associated with the tasks may be displayed by the CMS in association with the request and/or a CMS folder and/or the content item associated with the request. Thus, when the requestor accesses a particular folder or request with the CMS, task progress and/or other information about the task may be displayed to the user.

Figure 10:
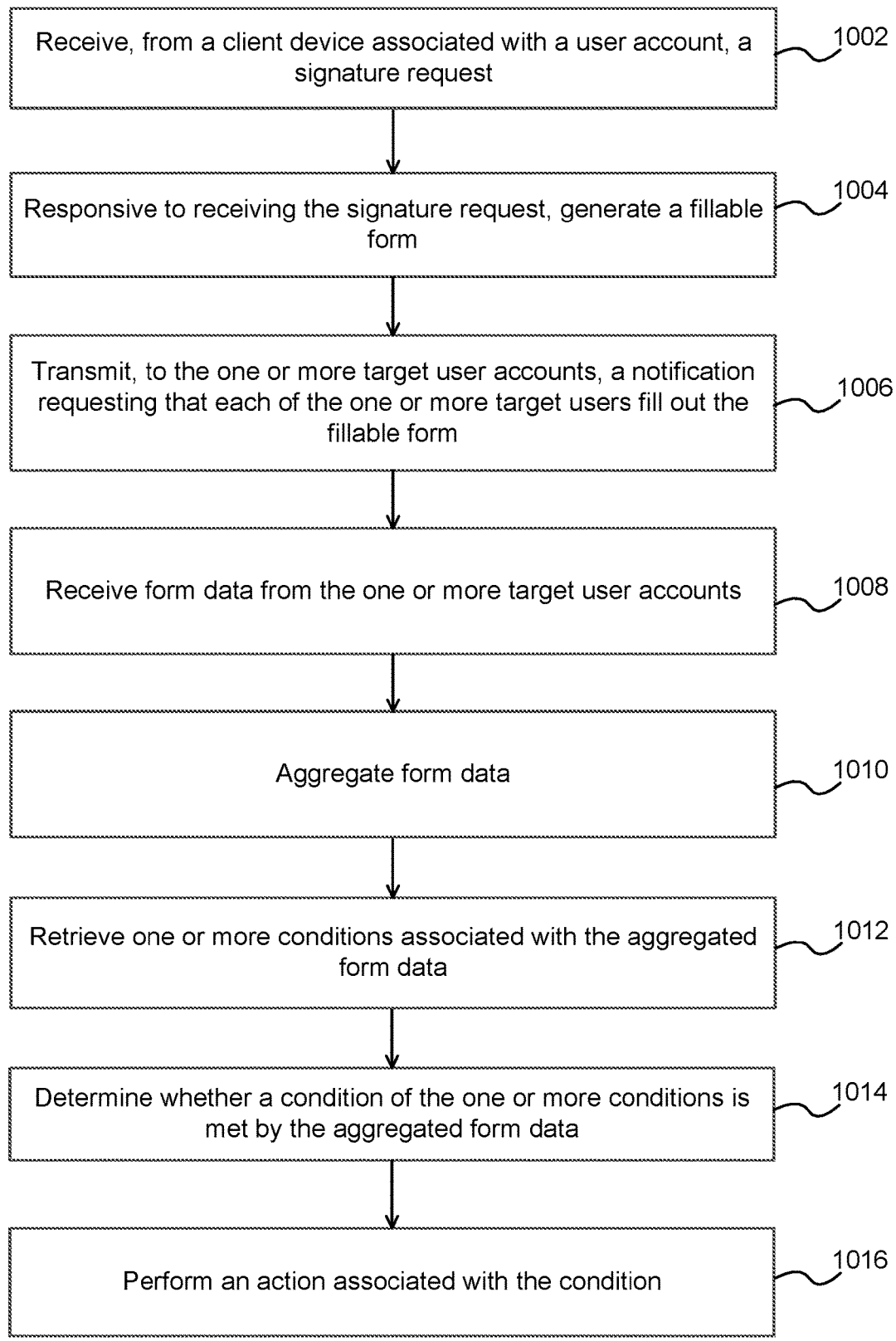
FIG. 10 is a flowchart of illustrative actions for processing electronic signature data in a collaborative environment and performing actions based on the received data.

FIG. 10 is a flowchart of illustrative actions for processing electronic signature data in a collaborative environment and performing actions based on the received data. At 1002, CMS 100 (e.g., via communications interface 300) receives from a client device associated with a user account, a signature request. At 1004, responsive to receiving the signature request, the CMS generates a fillable form. For example, the content item management module 308 or another suitable module may perform this action.

At 1006, the CMS may send, to the one or more target user accounts, a notification requesting that each of the one or more target users fill out the fillable form. The notification may include the fillable form or a link to the fillable form. For example, the CMS may use mail server module 322 to perform the transmission via communications interface 300. In some embodiments, a module specifically designed for this task may be added to the CMS. At 1008, the CMS may receive form data from the one or more target user accounts. For example, the CMS may receive the form data via mail server module 322 and/or via communications interface 300. In some embodiments, a module specifically designed for this task may be added to the CMS.

At 1010, the CMS aggregates the form data. For example, a processor may aggregate the form data in content storage 318. At 1012, the CMS retrieves one or more conditions associated with the aggregated form data. The CMS may retrieve the one or more conditions from content storage 318 and/or from user account database 316. At 1014, the CMS determines whether a condition of the one or more conditions is met by the aggregated form data. For example, content item management module 308 may perform this determination. In some embodiments, a module specifically designed for this task may be added to the CMS. At 1016, the CMS performs an action associated with the condition. For example, content item management module 308 may perform an action. In some embodiments, a module specifically designed for this task may be added to the CMS.

In some embodiments, a component of the CMS (e.g., a client application) residing on a client device may present an icon to a user to automatically generate a request based on an image that is captured based on the user's command. For example, when the user selects the icon, the component of the CMS on the client device may automatically enable a camera associated with the user's device and prompt the user to capture an image of a physical document. When the user captures the image of the physical document, the component of the CMS residing on the client device may send the image (e.g., through an interface with the CMS) to the CMS. The CMS may receive the image from the client device and may automatically generate a signature request from the image. That is, the CMS may generate a fillable form from the image and send the fillable form to target users (e.g., specified by the user during and/or immediately after capturing the image). The request may be handled in the same manner as other requests.

Additional Considerations

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
   receiving, from a first client device associated with a first user, a signature request associated with an original document file stored on a content management system, the original document file comprising an overlaid field;
   generating, based on the original document file, a web adaptable fillable form that is a separate file from the original document file, the web adaptable fillable form generated to send to client devices to collect form data input for the signature request;
   mapping a field within the web adaptable fillable form to the overlaid field within the original document file stored on the content management system;
   providing the web adaptable fillable form to a second client device associated with a second user;
   receiving, from the second client device, form data input via the field within the web adaptable fillable form; and
   importing the form data into the original document file based on the mapping between the field within the web adaptable fillable form and the overlaid field corresponding to the original document file to generate a modified original document file comprising the form data.

2. The method of claim 1, further comprising synchronizing, from the content management system to the first client device associated with the first user, the modified original document file comprising the form data based on the content management system detecting an update to original document file.

3. The method of claim 1, further comprising:
sharing, by the content management system, the original document file with the first client device associated with the first user and a third client device associated with a third user; and
providing, by the content management system to the first client device and to the third client device, the modified original document file comprising the form data based on the original document file being shared with the first client device and the third client device.

4. The method of claim 1, further comprising providing, by the content management system to the second client device, access to the modified original document file comprising the form data by sending a link associated with the modified original document file to the second client device.

5. The method of claim 4, wherein providing the second client device access to the modified original document file does not require the second client device to have a user account within the content management system.

6. The method of claim 4, wherein providing the second client device access to the modified original document file comprises providing the modified original document file with defined access permissions.

7. The method of claim 1, further comprising:
determining a device type of the second client device associated with the second user; and
providing, for display within a graphical user interface of the second client device, the web adaptable fillable form in a compatible format based on the device type.

8. A system comprising:
at least one processor; and
a non-transitory computer readable storage medium comprising instructions that, when executed by the at least one processor, cause the system to:
receive, from a first client device associated with a first user, a signature request associated with an original document file stored on a content management system, the original document file comprising an overlaid field;
generate, based on the original document file, a web adaptable fillable form that is a separate file from the original document file, the web adaptable fillable form generated to send to client devices to collect form data input for the signature request;
map a field within the web adaptable fillable form to the overlaid field within the original document file stored on the content management system;
provide the web adaptable fillable form to a second client device associated with a second user;
receive, from the second client device, form data input via the field within the web adaptable fillable form; and
generate a modified original document file by adding the form data into the original document file based on the mapping between the field within the web adaptable fillable form and the overlaid field corresponding to the original document file.

9. The system of claim 8, further comprising instructions that, when executed by the at least one processor, cause the system to:
detect, by the content management system, an update to the original document file; and
provide, by the content management system, the modified original document file to the first client device based on detecting the update to the original document file.

10. The system of claim 9, wherein providing the modified original document file to the first client device comprises automatically synchronizing the modified original document file with the first client device.

11. The system of claim 8, further comprising instructions that, when executed by the at least one processor, cause the system to:
store, by the content management system, the original document file within a shared folder associated with the first client device associated with the first user and a third client device associated with a third user; and
based on generating the modified original document file comprising the form data, providing, to the first client device and to the third client device, the modified original document file based on the first client device and the third client device being associated with the shared folder.

12. The system of claim 8, further comprising instructions that, when executed by the at least one processor, cause the system to:
store, by the content management system, the original document file within a shared folder associated with a plurality of additional client devices, the plurality of additional client devices comprising the first client device; and
providing, in response to the content management system identifying an update to the original document file, the modified original document file comprising the form data to the plurality of additional client devices based on the plurality of additional client devices being associated with the shared folder.

13. The system of claim 12, further comprising instructions that, when executed by the at least one processor, cause the system to provide, by the content management system to the second client device, access to the modified original document file comprising the form data by providing access to the shared folder to the second client device.

14. The system of claim 13, wherein providing the second client device access to the shared folder does not require the second client device to have a user account within the content management system.

15. The system of claim 13, wherein providing the second client device access to the shared folder comprises applying access permissions to the shared folder for the second client device.

16. A non-transitory computer readable storage media storing instructions thereon that, when executed by at least one processor, cause a computing device to:
receive, from a first client device associated with a first user, a signature request associated with an original document file stored on a content management system, the original document file comprising an overlaid field;
generate, based on the original document file, a web adaptable fillable form that is a separate file from the original document file, the web adaptable fillable form generated to send to client devices to collect form data input for the signature request;

map a field within the web adaptable fillable form to the overlaid field within the original document file stored on the content management system;

provide the web adaptable fillable form to a target client device associated with a target user;

receive, from the target client device, form data input via the field within the web adaptable fillable form, the form data comprising signature data; and generate a signed original document file by adding the signature data into the original document file based on the mapping between the field within the web adaptable fillable form and the overlaid field corresponding to the original document file.

17. The non-transitory computer readable storage media as recited in claim 16, further comprising instructions that, when executed by at least one processor, cause the computing device to:

detect, by the content management system, an update to the original document file based on adding the signature data into the original document file; and automatically synchronize, by the content management system, the signed original document file to the first client device based on detecting the update to the original document file.

18. The non-transitory computer readable storage media as recited in claim 16, further comprising instructions that, when executed by at least one processor, cause the computing device to:

store, by the content management system, the original document file within a shared folder associated with a plurality of additional client devices, the plurality of additional client devices comprising the first client device; and providing, in response to the content management system identifying an update to the original document file, the signed original document file to the plurality of additional client devices based on the plurality of additional client devices being associated with the shared folder.

19. The non-transitory computer readable storage media as recited in claim 16, further comprising instructions that, when executed by at least one processor, cause the computing device to provide, by the content management system to the target client device, access to the signed original document file by sending a link associated with the signed original document file to the target client device.

20. The non-transitory computer readable storage media as recited in claim 16, further comprising instructions that, when executed by at least one processor, cause the computing device to:

determine a device type of the target client device associated with the target user; and providing, for display within a graphical user interface of the target client device, the web adaptable fillable form in a compatible format based on the device type.

* * * * *